United States Patent
Champion et al.

(10) Patent No.: US 7,396,789 B2
(45) Date of Patent: Jul. 8, 2008

(54) GASIFIER REACTOR INTERNAL COATING

(75) Inventors: Thibault Pierre Paul Champion, Cheval Blanc (FR); Christian Claude His, Cavaillion (FR); Franceline Marguerite Louise Villermaux, Avignon (FR)

(73) Assignee: Saint-Gobain centre de Recherches et d'Etudes Europeen, Courbevoie (FR)

( * ) Notice: Subject to any disclaimer, the term of this patent is extended or adjusted under 35 U.S.C. 154(b) by 91 days.

(21) Appl. No.: 11/166,275

(22) Filed: Jun. 27, 2005

(65) Prior Publication Data

US 2006/0211566 A1    Sep. 21, 2006

(30) Foreign Application Priority Data

Mar. 15, 2005    (FR)    ................... 05 02529

(51) Int. Cl.
C04B 35/48    (2006.01)
C04B 35/12    (2006.01)
C04B 35/105    (2006.01)

(52) U.S. Cl. ................... 501/103; 501/104; 501/105; 501/126

(58) Field of Classification Search ................ 501/126, 501/103, 104, 105
See application file for complete search history.

(56) References Cited

U.S. PATENT DOCUMENTS 5,053,366 A    10/1991    Schoennahl
5,106,795 A     4/1992    Drake et al.

FOREIGN PATENT DOCUMENTS

JP    8-91915    *    4/1996

OTHER PUBLICATIONS

Taber, W., "Refractories for Gasification", *Refractories Applications and News*, vol. 8, No. 4, Jul.-Aug. 2003, pp. 1822.
Bennett, J., "Refractory liner materials used in slagging gasifiers", *Refractories Applications and News*, vol. 9, No. 5, Sep./Oct. 2004, pp. 20-25.
Clayton, S. et al., "Gasification Technologies, Gasification Markets and Technologies-Present and Future, an Industry Perspective", US DOE report DOE/FE 0447, Jul. 2002.
Zhe, W. et al., "Application of $ZrO_2$ in high $Cr_2O_3$ low cement castable refractories for refuse melter", Proceedings of the $8^{th}$ Biennial UNITEC Congress. "Worldwide Conference Refractories ECO Refractory For The Earth", held from Oct. 19-22, 2003 in Osaka, Japan.

* cited by examiner

*Primary Examiner*—Karl E Group
(74) *Attorney, Agent, or Firm*—Young & Thompson

(57)    ABSTRACT

A gasifier internal refractory coating has at least one region of a sintered material containing at least 45% by weight of chromium oxide ($Cr_2O_3$) and at least 1% by weight of zirconium oxide, at least 20% by weight of the zirconium oxide ($ZrO_2$) being stabilized in the cubic and/or quadratic form.

16 Claims, No Drawings

GASIFIER REACTOR INTERNAL COATING

BACKGROUND OF THE INVENTION

1. Field of the invention

The invention concerns a gasifier reactor internal coating.

2. Description of the Prior Art

There is known in the art in particular a gasifier used to gasify coal. The coal gasification process, that has been known in the art for around fifty years, is currently experiencing strong growth because it can be used, starting from highly diverse hydrocarbon materials, for example coal, petroleum coke, and even heavy oils to be recycled, to produce synthesis gases serving as an energy source and as basic compounds for the chemical industry. This process also eliminates unwanted components, for example NOx, sulfur or mercury, before discharge into the atmosphere.

The principle of gasification consists in controlled partial combustion, under pressure and in a steam or oxygen atmosphere, at a temperature from approximately 1000° C. to approximately 1600° C.

There exist different types of reactor, known as "gasifiers", with fixed, fluidized or driven beds. These reactors differ in the mode of introduction of the reactants, the manner in which the fuel and the oxidizer are mixed, the temperature and pressure conditions, and the method of evacuating liquid residual slag or ash resulting from the reaction.

The article "Refractories for Gasification" published in the journal "Refractories Applications and News", Volume 8, Number 4, July-August 2003, written by Wade Taber of the Energy Systems department of the Saint-Gobain Industrial Ceramics Division, describes the structure of a gasifier internal coating. The gasifier is coated with various layers of refractory products capable of withstanding the conditions of temperature, pressure and chemical environment to which they are subjected during gasification. The layers of refractory products thus protect the metal interior wall of the gasifier from heat and from corrosion by gases and slag.

The refractory product at the hot face is more particularly subjected to erosion and chemical attack by ash or slag, which leads to the infiltration of compounds from the liquefied ash or slag into the pores of the refractory product. As a result of erosion and thermal cycling, this infiltration can cause spalling of the coating, and finally to shutting down of the reactor.

To increase the service life of refractory coatings, researchers have attempted to increase their thickness. However, this solution has the drawback of reducing the usable volume of the gasifier and therefore its yield.

James P. Bennett, in the article "Refractory liner used in slagging gasifiers" published in the journal "Refractories Applications and News", Vol 9, Number 5, September/October 2004, pages 20-25, explains that the service life of current gasifier refractory coatings, in particular in air-cooled systems, is very limited despite their high content of chromium oxide. He mentions in particular the report by S. J. Clayton, G. J. Stiegel and J. G. Wimer "Gasification Technologies, Gasification Markets and Technologies—Present and future, an Industry Perspective", US DOE report DOE/FE 0447, July 2002.

There is therefore a requirement for a refractory coating adapted to resist the corrosion encountered in gasifiers more effectively and more durably than prior art products.

The object of the invention is to satisfy this requirement.

SUMMARY OF THE INVENTION

According to the invention, the above object is achieved by means of a gasifier internal refractory coating having at least one region of a sintered material containing at least 45% by weight of chromium oxide ($Cr_2O_3$) and at least 1%, preferably at least 2%, and more preferably at least 3%, by weight of zirconium oxide ($Z_rO_2$), at least 20%, preferably at least 30%, by weight of said zirconium oxide ($ZrO_2$) being stabilized in the cubic and/or quadratic form.

As will emerge in more detail in the remainder of the description, surprisingly, the presence of at least 1% zirconium oxide of which at least 20% by weight is stabilized in the cubic and/or quadratic form reduces infiltration and attack by slag without degrading the other functional properties of the coating.

Said coating material of the invention preferably has one or more of the following optional features:

At least 60% of the zirconium oxide is stabilized in the cubic and/or quadratic form.

Said material contains at least one dopant, stabilizing or not stabilizing the zirconium oxide, selected from CaO, MgO, $Y_2O_3$ and $TiO_2$, the preferred dopant being CaO. The content of calcium oxide (CaO) of said material is preferably less than 1.0% by weight. The dopant preferably stabilizes the zirconium oxide, at least in part.

The content of zirconium oxide ($ZrO_2$) is greater than 4.5%, preferably greater than 6% by weight, and/or less than 7% by weight.

The content of chromium oxide ($Cr_2O_3$) is greater than 60% by weight and preferably greater than 80% by weight.

Said material has an aluminum oxide ($Al_2O_3$) content greater than 1% by weight, preferably greater than 2% by weight, and/or less than 10% by weight, preferably less than 5% by weight, preferably less than 3.5% by weight.

Said material has a silica content greater than 0.5% by weight, preferably greater than 1% by weight, and/or less than 3% by weight, preferably less than 1.5% by weight.

The sum of the contents of oxides of chromium ($Cr_2O_3$), zirconium ($ZrO_2$), aluminum ($Al_2O_3$), silicon ($SiO_2$) and calcium oxide (CaO) is greater than 95%, preferably greater than 98%, by weight, the other constituents of the product being impurities. The impurities conventionally comprise iron essentially in the form of $Fe_2O_3$ and oxides of alkali metals such as $Na_2O$ and $K_2O$. Such contents of impurities are not considered to call into question the advantages obtained from using the material.

The structure of the material features a granulate of chromium oxide bound by a matrix comprising grains including zirconium oxide and a dopant selected from CaO, MgO, $Y_2O_3$ and $TiO_2$, the dopant, stabilizing or not stabilizing the zirconium oxide, the percentage of zirconium oxide contained in said grains being greater than 1%, preferably greater than 2.5%, by weight relative to the weight of the material. The dopant content in the grains containing zirconium oxide and a dopant is preferably from 1% to 8% by weight relative to the weight of said grains.

The material takes the form of a layer applied to the interior wall of a reactor of the gasifier or of an assembly of blocks arranged to protect said wall. The whole of the layer or all the blocks of the assembly preferably consist(s) of a material such as that defined hereinabove.

In the present description, all percentages are percentages by weight unless otherwise indicated.

The composition of the slags in gasifiers typically consists of $SiO_2$, FeO or $Fe_2O_3$, CaO and $Al_2O_3$. It may also include other oxides derived from products feeding the reactor. The base index $B=(CaO+MgO+Fe_2O_3)/(Al_2O_3+SiO_2)$ is typically about 0.6 and the ratio $C/S=CaO/SiO_2$ is typically 0.4, the contents being expressed as percentages by weight.

Wang Zhe, as reported in the paper "Application of $ZrO_2$ in high $Cr_2O_3$ low cement castable refractories for Refuse Melter" published in the proceedings of the 8th Biennial UNITEC Congress "Worldwide Conference Refractories ECO Refractory For The Earth" held from 19-22 Oct. 2003 in Osaka (Japan), studied the behavior of products with high chromium oxide and aluminum oxide contents, containing no silicon oxide, in relation to corrosive slags encountered in furnaces for incineration of domestic or industrial waste. The addition of a highly stabilized zirconia in cubic form representing from 3.2% to 6.4% of the total composition is described as unfavorable to resistance to dissolution by the slags cited in the above publication However, incineration furnace slags are very different from those of gasifiers, as they have the following characteristics: B index of approximately 1.2; C/S ratio of approximately 1.5.

A coating must be adapted to the corrosive conditions that it encounters. Thus it cannot be expected that a coating known to be resistant to certain corrosive conditions will be equally resistant when subjected to other corrosive conditions. Thus it is found that materials conforming to the invention include the materials described by Wang Zhe as ineffective for waste incineration furnaces. Surprisingly, the inventors have discovered that these materials are effective in an application to a gasifier coating.

In applications such as glassmaking furnaces or iron and steel furnaces, as described in the patent EP 0404 610, for example, there are known in the art products consisting of zirconium oxide and chromium oxide. These products contain zirconium oxide in a proportion from 1% to 9% by weight relative to the total composition. According to the above patent, it is essential that at least 80% of the zirconium oxide be in the monoclinic form, monoclinic zirconium being described as the "key ingredient" for improving resistance to thermal shocks. Surprisingly, in the light of this teaching, the inventors have discovered that, in the application to a gasifier coating, the presence of zirconium oxide stabilized to at least 20% is, on the contrary, advantageous.

Zirconium oxide can be stabilized by means of a stabilizing dopant and/or by heat treatment at very high temperature (typically greater than 1700° C.). According to the invention at least 20% by weight of the zirconium oxide is stabilized in the cubic and/or quadratic form.

A dopant selected from CaO, MgO, $Y_2O_3$ and $TiO_2$, acting or not acting as a stabilizer, is preferably present in the coating material of the invention.

The refractory coating material of the invention consists of one or more granulates, i.e. particles having a particle size greater than 150 μm, surrounded by a binder matrix.

The granulates may have diverse chemical compositions, in particular they can consist of chromium oxide, the total content of chromium oxide of the material being at least 45% by weight.

The binder matrix comprises grains, i.e. particles having a particle size less than 150 μm, including zirconium oxide and a dopant. According to the invention, the zirconium oxide alone present in these grains preferably represents more than 2.5% of the total weight of the material. In these grains, the dopant may have the function of stabilizing the zirconium oxide or not. The binder matrix may further comprise other grains, in particular grains of zirconium oxide with no dopant.

The coating of the invention may be fabricated in the form of a layer obtained from a non-worked product or in the form of an assembly of refractory blocks.

To fabricate a coating in the form of a layer, a base mixture is prepared of particles of chromium oxide and zirconia, and possibly other oxides, in proportions determined as a function of the composition of the required material. The dopant may be added to the mixture and/or be included with the zirconia, as a stabilizer. Forming additives may be added to facilitate use, preferably in a proportion of less than 7%.

The manner of determining the proportions of the constituents of the base mixture is well known to the person skilled in the art. In particular, the person skilled in the art knows that the chromium, aluminum and zirconium oxides present in the base mixture are found in the sintered refractory material. Certain oxides of this material can also be introduced by the additives. The composition of the base mixture may therefore vary, in particular as a function of the quantities and the nature of the additives present.

The chromium oxide may be added in the form of a mixture of sintered or fused chromium oxide particles. The aluminum oxide may be added in the form of a mixture of calcined or reactive particles of alumina, or even of white corundum. The zirconium oxide may be added in the form of commercially available unstabilized zirconia and/or in the form of stabilized zirconia, for example zirconia from Unitec, in powder form.

A powder is made up of particles of which 90% by weight have a particle size less than 150 μm.

The base mixture preferably includes at least 0.2% by weight of stabilized zirconia powder.

The base mixture preferably includes:

at least 60% of a particular mixture based on oxides of which at least 90% by weight consists of particles having a particle size greater than 150 microns but less than 20 mm;

less than 40% of a mixture of particles, at least 90% by weight of the particles having a particle size less than 150 μm;

less than 7% of one or more forming additives well known to the person skilled in the art.

The base mixture is preferably homogenized and conditioned. A mixture of this kind is advantageously ready for use and may be applied to the interior wall of the reactor, for example by casting, vibrocasting or spraying, as a function of requirements and with great flexibility, and then sintered in situ during preheating of the reactor, to produce a refractory coating of the invention. Sintering occurs at atmospheric pressure, in an oxidizing atmosphere and at a temperature from 1300° C. to 1600° C.

To fabricate a coating of the invention, it is equally possible to assemble sintered blocks or prefabricated blocks which are then sintered in service when the reactor is heated up.

To fabricate a sintered block, a fabrication method may be used that includes the following successive steps:

a) preparing a charge, b) forming said charge in a mold, c) casting said charge in the mold or compacting the charge by vibration and/or pressing and/or pounding of said charge in the mold to form a preform, d) removing the preform from the mold, e) drying said preform, preferably in air or a moisture-controlled atmosphere, and preferably so that the residual moisture content of the preform is from 0 to 0.5%, f) firing said preform in an oxidizing atmosphere at a temperature from 1300° C. to 1600° C. to form a fashioned refractory product, or a sintered "refractory block".

Like the base mixture described above, the charge includes oxides determined as a function of the final composition of the block, precursors thereof and temporary forming additives.

The steps a) to f) are steps conventionally employed in the art to fabricate sintered products.

In step a), the manner of determining the quantities of the constituents of the refractory product is well known to the person skilled in the art. In particular, the person skilled in the art knows that the chromium, aluminum and zirconium oxides present in the starting charge are found in the fabricated refractory product. Certain oxides may also be introduced by the additives. For the same quantity of constituents of the sintered refractory product, the composition of the starting charge may therefore vary, in particular as a function of the quantities and the nature of the additives present in the charge.

The additives may be added to the starting charge to ensure that it is sufficiently plasticized during the step b) of forming it and to confer sufficient mechanical strength on the preform obtained at the end of the steps d) and e). Non-limiting examples of additives that may be used are:

- organic temporary binders (i.e. binders that are eliminated wholly or in part during drying and firing steps), such as resins, derivatives of cellulose or lignone, polyvinyl alcohols; the quantity or temporary binder is preferably from 0.1% to 6% by weight relative to the weight of the particular mixture of the charge;
- forming agents such as stearates of magnesium or calcium;
- hydraulic binders such as CaO aluminate cement;
- deflocculating agents such as alkaline polyphosphates or methacrylate derivatives;
- sintering promoters such as titanium dioxide or magnesium hydroxide;
- clay type additives that facilitate use and assist sintering; the above additives introduce alumina and silica and a few oxides of alkali or alkaline-earth metals, even iron oxide, depending on the type of clay.

The above quantities of additives are not limiting on the invention. In particular, the quantities conventionally used in sintering processes are appropriate.

The mixing of the various constituents of the charge continues until a substantially homogeneous mass is obtained.

In the step b), the charge is formed and disposed in a mold.

In the step c), in the case of forming by pressing, a specific pressure of 400 to 800 kg/cm$^2$ is appropriate. Pressing is preferably effected uniaxially or isostatically, for example by means of a hydraulic press. It may advantageously be preceded by an operation of manual or pneumatic ramming and/or of vibration.

The drying of the step e) may be effected at a moderately high temperature. It is preferably effected at a temperature from 110° C. to 200° C. It conventionally takes from ten hours to one week, depending on the format of the preform, continuing until the residual moisture content of the preform is less than 0.5%.

The dried preform is then fired (step f)). The firing time, from approximately three days to approximately 15 days from cold to cold, varies as a function of the materials but also as a function of the size and the shape of the parts. The firing cycle is preferably effected in the conventional manner, in air, at a temperature from 1300° C. to 1600° C.

Surprisingly, the fashioned refractory product obtained at the end of the step f) has proved particularly resistant to the stresses encountered inside gasifier reactors, in particular to infiltration by fused ash or slag.

To fabricate a prefabricated block, the process steps a) to e) described above are used, but at least part of the firing step f) is effected after assembling the blocks in the reactor.

The blocks are assembled by means of appropriate expansion joints, using techniques well known to the person skilled in the art.

DESCRIPTION OF PREFERRED EXAMPLES

The following examples provide a non-exhaustive illustration of the invention. The following raw materials were used for these examples:

- particulate mixture of chromium oxide, with a purity of 98% $Cr_2O_3$ by weight, and consisting of at least 90% by weight of particles having a size greater than 20 microns but less than 20 mm,
- pigmentary chromium oxide powder (>98% of $Cr_2O_3$) whose median diameter (D50) is less than 2 microns,
- calcined or micronized alumina powder with a median diameter of 5 microns,
- monoclinic zirconia powder from ZIRPRO having the characteristics set out in table 1 below (powder P1),
- additives: magnesium or calcium stearates, temporary binders (derivatives of cellulose or lignone), chemical binders (phosphoric acid, derivatives of aluminum monophosphate),
- stabilized zirconia powder from UNITEC, with the characteristics set out in table 1 below (powder P2),
- clay with a content of alumina >30%.

TABLE 1

|  | P1 | P2 |
|---|---|---|
| D50 (μm) | 3.9 | 20.0 |
| $ZrO_2$ + $HfO_2$ (% by weight) | 98.5 | 93.6 |
| CaO (% by weight) | 0.05 | 4.3 |
| Crystalline phases | Monoclinic (100%) | Monoclinic (33%), Cubic + tetragonal (67%) |

In a first step a), the raw materials were mixed and 3% water added. This was followed by the process steps:

b) forming the charge in a mold,
c) compacting the charge in the mold at a pressure of 600 kg/cm$^2$ to form a preform,
d) removing the preform from the mold,
e) drying the preform, in air, to obtain a residual moisture content of the material less than or equal to 0.5%,
f) firing said preform in an oxidizing atmosphere at a temperature from 1400° C. to 1600° C. to form a fashioned refractory product.

The contents of aluminum, chromium, silicon and calcium oxides in the sintered final product were calculated from the chemical composition of the raw materials used for the starting charge.

Observation of the microstructure of the products of the invention shows that they consist of a granulate of chromium oxide surrounded by a binder matrix that contains, for the products 2 to 5, grains of $ZrO_2$—CaO. Microprobe analysis identifies the content of the elements of the grains of $ZrO_2$—CaO coming from the powder P1 or P2.

The density and open porosity were measured on the products before any corrosion had occurred and in accordance with the standard ISO 5017.

Further measurements were effected on products subjected, after the step f), to corrosion representative of the service conditions suffered by the hot face of gasifier coatings. This corrosion was obtained in the following manner. Samples of the product to be tested with a size of 25×25×180 mm$^3$ placed in a furnace crucible were immersed in fused slag at a temperature of 1600° C. for four hours in an argon atmosphere. The samples were rotated at a speed of 2 rpm.

The slag used contained in particular:

SiO$_2$: approximately 30-50%
Al$_2$O$_3$: approximately 10-20%
Fe$_2$O$_3$ or FeO: 15-25%
CaO: approximately 10-20%

The base index B of this slag, i.e. the (CaO+MgO+Fe$_2$O$_3$)/(SiO$_2$+Al$_2$O$_3$) mass ratio, was typically of the order of 0.6. The CaO/SiO$_2$ mass ratio was of the order of 0.4.

The following were evaluated: corrosion indicator, depth of penetration of the CaO of the slag, zirconia depletion, and value of residual modulus of rupture in bending after a thermal shock test.

The corrosion indicator is equal to the following ratio:

$$100 \times \frac{\text{loss of section of the sample of the product tested at the atmosphere slag triple point}}{\text{loss of section of the reference sample at the atmosphere slag triple point}}$$

the loss of section resulting from the corrosive attack by the slag described above and from the resulting dissolution of the refractory product.

The corrosion indicator is therefore 100 for the reference product and a value lower than 100 indicates better corrosion resistance than the reference product.

The depth of penetration of the CaO of the slag was measured by means of a microprobe on a metallographic section.

The maximum depth to which the zirconia constituting the refractory had been attacked and dissolved by the slag was measured by means of microphone. This depth is referred to as "depletion".

As the coating of the invention may be subjected in service to high stresses following thermal shocks, the inventors also measured the change in the modulus of rupture in bending of the products subjected to a thermal shock.

The residual modulus of rupture in bending after a thermal shock test was evaluated in accordance with the standard ISO 5014. It is listed as "Residual MOR" in table 2.

The table 2 below summarizes the results obtained.

TABLE 2

| | No. | | | | |
|---|---|---|---|---|---|
| | 1 | 2 | 3 | 4 | 5 |
| Zirconia powder of the charge (% by weight) | | | | | |
| P1 | 7 | 0 | 0 | 0 | 0 |
| P2 | 0 | 7 | 7 | 4.9 | 7.3 |
| Calculated chemical composition of the sintered product (% by weight) | | | | | |
| Cr$_2$O$_3$ | 87 | 87 | 87 | 91 | 88 |
| ZrO$_2$ | 7.0 | 6.4 | 6.4 | 4.4 | 6.7 |
| Al$_2$O$_3$ | 2.8 | 2.8 | 3.3 | 2.3 | 1.7 |
| SiO$_2$ | 0.4 | 0.4 | 1.2 | 0.9 | 0.9 |
| CaO | <0.1 | 0.3 | 0.3 | 0.2 | 0.3 |
| Other properties of the sintered product (before corrosion) | | | | | |
| Apparent density (g/cm$^3$) | 4.25 | 4.24 | 4.30 | 4.20 | 4.23 |
| Open porosity (%) | 15.2 | 14.5 | 12.1 | 13.3 | 12.7 |

TABLE 2-continued

| | No. | | | | |
|---|---|---|---|---|---|
| | 1 | 2 | 3 | 4 | 5 |
| Measured infiltration of CaO and depletion caused by corrosion | | | | | |
| Depletion of ZrO$_2$ (mm) | 1.5 | 0 | 0 | 0.5 | 0.3 |
| Depth of CaO infiltration after corrosion test (mm) | >10 | >10 | 3 | 5.4 | >10 |
| Measured dissolution caused by corrosion | | | | | |
| Corrosion indicator | 100 | 96 | 67 | 77 | 85 |
| Thermal shock resistance | | | | | |
| Residual MOR (MPa) | 8.5 | 7 | 11 | 13 | 12 |

Composition No. 1 is the reference composition.

Table 2 indicates that:

The addition of stabilized zirconia containing CaO (compositions 2-3-4-5-6) reduces the depletion of zirconia, i.e. attacking of the zirconia by the slag.

The presence of more than 0.5% silicon oxide is not harmful to corrosion resistance.

The presence of aluminum oxide may be favorable to resistance to calcium oxide infiltration, as is indicated by comparing compositions 2 and 3.

The calcium oxide added in particular by the source of the zirconia is not particularly harmful to the required properties.

The products of the invention have better corrosion resistance than the reference product.

Composition 3 offers the best compromise for the required properties and is preferred over all the others.

As is now clear, the coating of the invention advantageously reduces infiltration and attack by the slags encountered in gasifier reactors, without other functional properties thereof being degraded.

Of course, the present invention is not limited to the embodiments described, which are given by way of illustrative and non-limiting example.

There is claimed:

1. A gasifier internal refractory coating composition having at least one region of a sintered material containing
    at least 45% by weight of chromium oxide (Cr$_2$O$_3$),
    more than 0.5% and less than 3% by weight of silica, and
    at least 1% by weight of zirconium oxide, with at least 20% by weight of said zirconium oxide (ZrO$_2$) being stabilized in the cubic and/or quadratic form.

2. The coating composition claimed in claim 1, wherein at least 60% of said zirconium oxide is stabilized in the cubic and/or quadratic form.

3. The coating composition claimed in claim 1, wherein said sintered material contains at least one dopant selected from the group consisting of CaO, MgO, Y$_2$O$_3$ and TiO$_2$.

4. The coating composition claimed in claim 3, wherein said dopant is CaO.

5. The coating composition claimed in claim 1, wherein the content of said zirconium oxide (ZrO$_2$) is greater than 6% by weight and/or less than 7% by weight.

6. The coating composition claimed in claim 1, wherein the content of said chromium oxide (Cr$_2$O$_3$) is greater than 80% by weight.

7. The coating composition claimed in claim 1, wherein said sintered material has an aluminum oxide (Al2O3) content greater than 1% by weight and less than 10% by weight and a silica content greater than 0.5% by weight and less than 1.5% by weight.

8. The coating composition claimed in claim 1, wherein the structure of said material features a granulate of chromium oxide bound by a matrix comprising grains including zirconium oxide and a dopant selected from the group consisting of CaO, MgO, $Y_2O_3$ and $TiO_2T$.

9. The coating composition claimed in claim 8, wherein said dopant content in said grains is from 1% to 8% by weight relative to the weight of said grains.

10. The coating composition according to claim 1, wherein the refractory coating material of the invention consists of one or more particles having a particle size greater than 150 μm surrounded by a binder matrix.

11. The coating composition according to claim 10, wherein said particles consist of chromium oxide, the total content of chromium oxide of the material being at least 45% by weight.

12. The coating composition according to claim 10, wherein the binder matrix comprises particles having a particle size less than 150 μm, including zirconium oxide and a dopant, the zirconium oxide alone present in these particles representing more than 2.5% of the total weight of the material.

13. The coating composition according to claim 1, wherein the content of said zirconium oxide is greater than 6% by weight.

14. The coating composition according to claim 1, wherein said sintered material has an aluminum oxide ($Al_2O_3$) content less than 5% by weight.

15. A gasifier internal refractory coating composition having at least one region of a sintered material containing chromium oxide ($Cr_2O_3$) and at least 1% by weight of zirconium oxide, at least 20% by weight of said zirconium oxide ($ZrO_2$) being stabilized in the cubic and/or quadratic form, wherein the content of chromium oxide ($Cr_2O_3$) is greater than 80% by weight.

16. A gasifier internal refractory coating composition having at least one region of a sintered material containing
- at least 45% by weight of chromium oxide ($Cr_2O_3$),
- at least 1% by weight of zirconium oxide, at least 20% by weight of said zirconium oxide ($ZrO_2$) being stabilized in the cubic and/or quadratic form, and
- at least $Y_2O_3$, not stabilizing the zirconium oxide.

* * * * *